(12) United States Patent  
Gosset et al.

(10) Patent No.: US 8,560,520 B2  
(45) Date of Patent: Oct. 15, 2013

(54) INFORMATION RETRIEVAL USING TIME

(75) Inventors: Philip Charles Gosset, Stroud (GB); Richard Harper, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 12/868,995

(22) Filed: Aug. 26, 2010

(65) Prior Publication Data

US 2012/0054171 A1    Mar. 1, 2012

(51) Int. Cl.
G06F 17/30    (2006.01)

(52) U.S. Cl.
USPC ............ 707/709; 707/711; 707/722; 707/723

(58) Field of Classification Search
USPC .................................. 707/709, 711, 722, 723
See application file for complete search history.

(56) References Cited

U.S. PATENT DOCUMENTS

| | | | |
|---|---|---|---|
| 6,490,577 B1 | 12/2002 | Anwar | |
| 7,757,183 B2 | 7/2010 | Rutledge et al. | |
| 2005/0203970 A1* | 9/2005 | McKeown et al. | 707/203 |
| 2006/0271533 A1* | 11/2006 | Sakurai et al. | 707/5 |
| 2007/0179952 A1* | 8/2007 | Vespe et al. | 707/7 |
| 2008/0071830 A1* | 3/2008 | Pike | 707/104.1 |
| 2008/0215552 A1 | 9/2008 | Safoutin | |
| 2009/0037396 A1* | 2/2009 | Uematsu et al. | 707/4 |
| 2009/0055763 A1* | 2/2009 | Audet | 715/764 |
| 2009/0293011 A1 | 11/2009 | Nassar | |
| 2009/0307196 A1 | 12/2009 | Shuster | |
| 2010/0083105 A1* | 4/2010 | Channabasavaiah | 715/273 |
| 2011/0145698 A1* | 6/2011 | Penov et al. | 715/235 |
| 2011/0270816 A1* | 11/2011 | Gossel et al. | 707/706 |

FOREIGN PATENT DOCUMENTS

WO    WO2008043082 A2    4/2008

OTHER PUBLICATIONS

Hochheiser, et al., "A Dynamic Query Interface for Finding Patterns in Time Series Data", retrieved on Jul. 13, 2010 at <<http://delivery.acm.org/10.1145/510000/506460/p522-hochheiser.pdf?key1=506460&key2=6515384811&coll=GUIDE&dl=GUIDE&CFID=28890792&CFTOKEN=11707407>> ACM, Conference on Human Factors in Computing Systems (CHI), Minneapolis, Minnesota, Apr. 20, 2002, pp. 522-523.

Spark, "Real-Time Search and Discovery of the Social Web", retrieved on Jul. 13, 2010 at <<http://www.sparkmediasolutions.com/pdfs/SMS_Real_Time_Search.pdf>>, Spark Media Solutions, Dec. 7, 2009, pp. 1-20.

(Continued)

Primary Examiner — John E Breene
Assistant Examiner — Dennis Myint
(74) Attorney, Agent, or Firm — Zete Law, P.L.L.C.; MacLane C. Key

(57) ABSTRACT

Information retrieval using time is described. In an embodiment a web-crawler creates time objects which are composites of content of different media types obtained from potentially different sources and, for example, are about the same date or date range. For example, a time object may comprise an image and a piece of text about an event in 1977. In this case the time object may have the date 1977 stored with it as well as URLs of originating web pages. In an embodiment a user is able to query a search engine to retrieve time objects which are displayed in a manner related to the dates of the time objects. For example, the time objects may be displayed in chronological order against a time line. In examples time objects may be dynamically created as a web page is requested and displayed with that web page.

19 Claims, 10 Drawing Sheets

(56) References Cited

OTHER PUBLICATIONS

Yi, et al., "Online Data Mining for Co-Evolving Time Sequences", retrieved on Jul. 13, 2010 at <<http://www.biliris.com/alex/pubs/papers/00_muscles_de.pdf>>, IEEE Computer Society, International Conference on Data Engineering (ICDE), San Diego, California, 2000, pp. 13-22.

Zhao, et al., "Time-Dependent Semantic Similarity Measure of Queries Using Historical Click-Through Data", retrieved on Jul. 13, 2010 at <<http://delivery.acm.org/10.1145/1140000/1135858/p543-zhao.pdf?key1=1135858&key2=7494384811&coll=GUIDE&dl=GUIDE&CFID=28890792&CFTOKEN=11707407>> ACM, Proceedings of International World Wide Web Conference (WWW), Edinburgh, Scotland, May 2006, pp. 543-552.

\* cited by examiner

INFORMATION RETRIEVAL USING TIME

BACKGROUND

There is a growing need for new ways of searching for information which increase the relevance of documents found and which are simple and intuitive to use whilst being able to cope with the enormous amounts of information that exists on the internet and other sources.

Web search systems are an example of one type of information retrieval system although the present invention is concerned with information retrieval systems of any type. Web search systems enable us to find web sites that best suit our requirements. Three main components are used to achieve this: web crawlers; index generators; and query servers.

Web crawlers crawl the web one link at a time and send identified web pages to be indexed. This is achieved by making use of links between web sites. This web crawling process can be thought of as a continual process of identifying new web sites and identifying updates to existing web sites.

The crawling process enables many billions of web pages to be identified and in order to make use of this information a systematic way of retrieving pages is required. An index generator provides part of this means. Similar to an index in the back of a book, the index generator identifies keywords to associate with each website's content. Then, when you search for those keywords, the search system can find the most appropriate pages out of the billions that are available.

The index generator includes such information as how often a term is used on a page, which terms are used in the page title, or in the index, for the subsequent use of the query server in ranking the documents. Other information such as the language that the web site is written in and information about how many other web sites link to the web site concerned can also be used.

A query server (also referred to as a search engine) is used to rank the index documents on the basis of how well they match user input search terms. The query server analyses the user search terms and compares them with the indexed web pages. It generates a rank or score for the indexed web pages on the basis of the user input search terms. In this way, web pages relevant to the user search terms are identified with scores or ranks to indicate the degree of likelihood of relevance.

There is an ongoing need to improve the relevance of items retrieved by information retrieval systems such as web search systems. In addition, there is a need to achieve this in a fast and computationally inexpensive manner, which reduces the need for storage resources where possible.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Information retrieval using time is described. In an embodiment a web-crawler creates time objects which are composites of content of different media types obtained from potentially different sources and, for example, are about the same date or date range. For example, a time object may comprise an image and a piece of text about an event in 1977. In this case the time object may have the date 1977 stored with it as well as URLs of originating web pages. In an embodiment a user is able to query a search engine to retrieve time objects which are displayed in a manner related to the dates of the time objects. For example, the time objects may be displayed in chronological order against a time line. In examples time objects may be dynamically created as a web page is requested and displayed with that web page.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
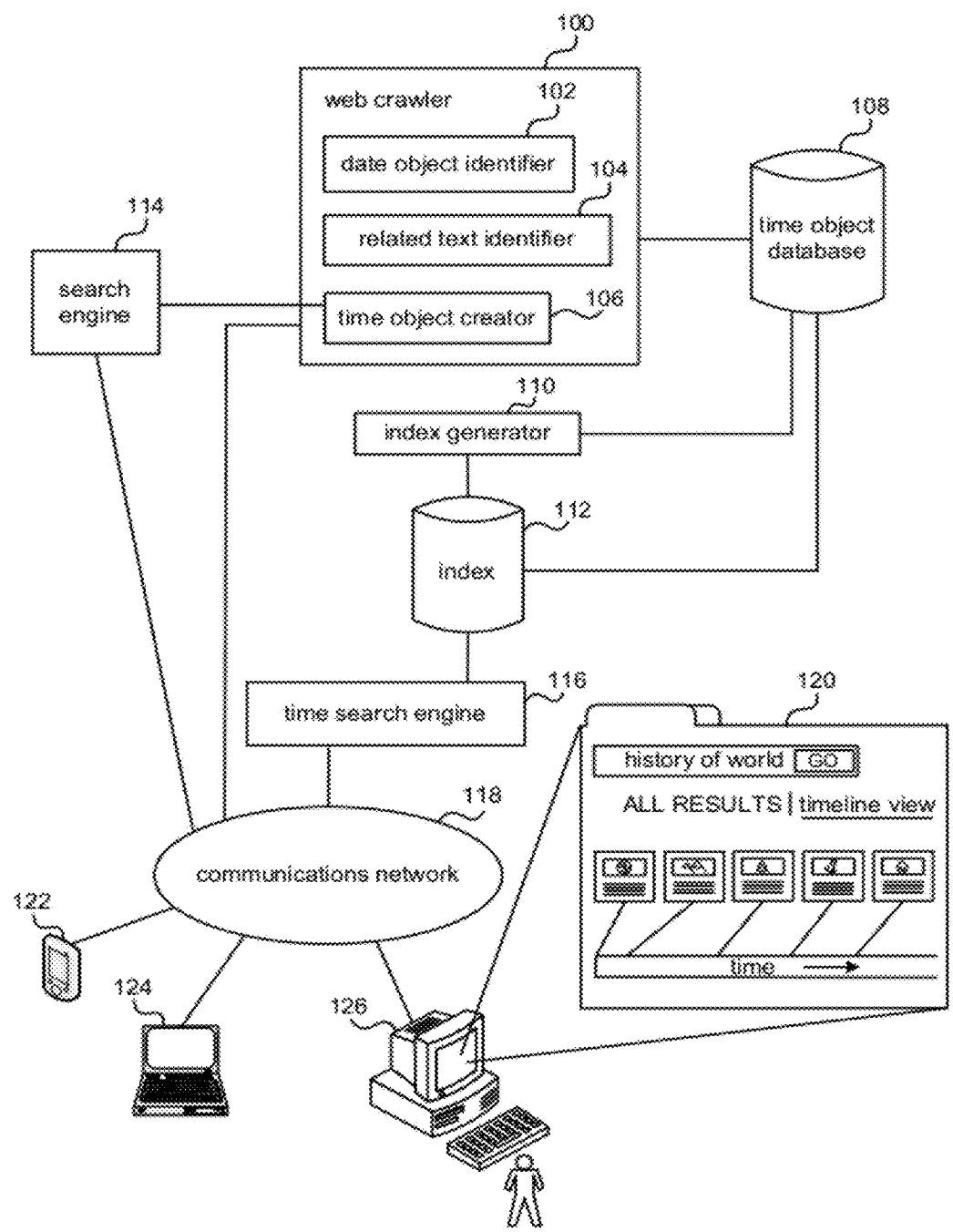
FIG. 1 is a schematic diagram of an information retrieval system incorporating a time search engine.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web-based information retrieval system, the system described is provided as an example and not a limitation. As those skilled in the art will appreciate, the present examples are suitable for application in a variety of different types of information retrieval systems.

There are many situations in which users wish to retrieve information which is time related or time pertinent. For example, a user might be researching a company and need to find information about the history of that company. Using a traditional web-based search engine a user is able to enter a query such as "history of company x" and obtain a ranked list of results. The ranked list of results may be a list of web sites ranked by a degree of relevance (determined by criteria, such as similarity of word(s) and wording, by 'hot links', or by searching the web site text index terms) of those web sites to the query term. Each of the web sites in the ranked list is likely to have different pieces of information about the history of company x and the user then views each of those web sites and extracts the time related information that is required. That is the user dates the information themselves. This may be time consuming and complex for the user. It is difficult for the user to quickly gain a high level understanding of the history of company x. In addition, the user is not easily able to understand the type and extent of information available about the history of company x. The user is presented with only the highest 10 or so ranked items in the list and cannot easily tell what amounts or types of other information is potentially available.

The embodiments described herein use time objects which are created as composites of existing content, potentially from different sources. Each time object has a single date object comprising a date or time, either of which may be a value or range. A time object is a composite of at least two different media types of content and where the content in the time object is all related to the date object of that time object; that is the content is time related. For example, text from a first web page and an image from a second web page where that content is about the same date or date range. The first and second web pages may be independent of each other in that they may have different URLs and no hyperlinks are present in those web pages which link those pages directly. Any media types of content may be used and a non-exhaustive list of examples is: text, image, video, audio file, email, SMS message, social networking service update, web page, blog, document, slide presentation, spreadsheet.

The time objects are created by a web crawler as described in more detail below. In some embodiments the time objects are pre-computed in an offline or behind the scenes process. In other embodiments the time objects are dynamically computed. By using time objects the embodiments described enable users to quickly and effectively obtain time-pertinent information and also to explore the internet (or other information sources) in a time-based manner. For example, users are able to explore the internet using a view point that is time related or optimized for time related content.

FIG. 1 is a schematic diagram of an information retrieval system incorporating a time search engine 116. Users at user devices such as PDA 122, laptop 124 or PC 126 are able to send queries to the time search engine 116 over a communications network 118. For example, the time search engine may provide a web-based user interface and the user devices may provide web-browsers. When a user submits a query to the time search engine 116 a ranked list of time objects is returned and displayed at the user device. An example display 120 is shown schematically at PC 126 in FIG. 1. The time objects are retrieved from time object database 108 and they are displayed at the user device in a time dependent manner or other time order. For example, in a chronologically ordered list, in an ordered list along a time line, clustered by time ranges, clustered by decades, or in other ways as described below. In this way a user obtains time-related content in an intuitive and easily understandable manner which enables a high level understanding of the type and amounts of information available to be gained. The user is able to select individual time objects in order to pursue his or her search further. This is described in more detail below. The time search engine and/or the use of time objects thus provides the user with a different understanding of the subject being searched or the question being asked, as compared with a conventional search engine. It may be used in conjunction with a conventional search engine to obtain a broader understanding of the type and extent of information available related to a particular query.

The time search engine is connected to an index 112 of time objects. That index is formed by an index generator 110 using information about the time objects and optionally using such information from the sources of the content in those time objects. Other information may also be used for forming the index 112.

A web crawler 100 is provided which is connected to the communications network 118. The web crawler 100 is computer-implemented and comprises a date object identifier 102, a related text identifier 104 and a time object creator 106. The web crawler 100 is connected to a time object database 108.

The web crawler traverses the web looking for objects in web pages that look like dates. These dates may relate to various time-scales or time-spans: centuries, decades, years, months, dates and times. For example, the web crawler accesses web pages from other entities in the communications network 118 which may comprise the Internet, one or more Intranets or other communications networks having web content. The web crawler accesses the web pages in any suitable manner, for example, by using links between the web pages or in other ways. The web crawler 100 comprises or is in communication with a computer-implemented date object identifier 102. This component is arranged to find date objects in web pages. The term "date object" is used to refer to absolute numerical and/or textual date information of any format or relative date information (e.g. when a date period is specified).

For each date object that the web crawler finds in a web page, it finds a piece of text from the same web page which is related to the date object. This is achieved using the related text identifier 104 which may be integral with the web crawler or may be in communication with the web crawler. For example a web page may comprise the following text "On Jan. 1, 1979 the company moved from Albuquerque to a new home in Bellevue, Wash." An example of a date object is "Jan. 1, 1979". An example of a piece of related text is "From Albuquerque to a new home in Bellevue, Wash.". The web crawler uses the related text to find another item of content of a different media type. For example, the web crawler submits the related text as a query to a search engine 114 and retrieves an image. A time object creator 106 at the web crawler or in communication with the web crawler, takes the text and the item of content of a different media type and forms a time object as described in more detail below.

Figure 2:
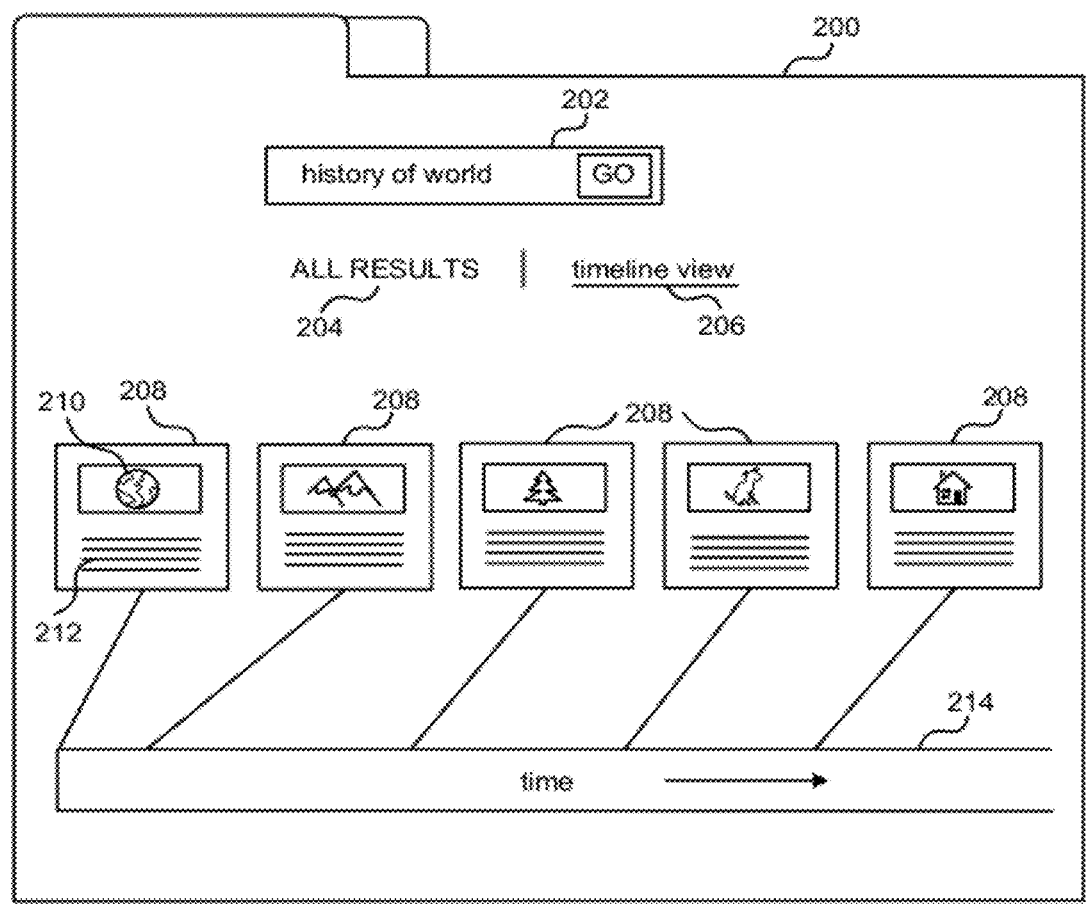
FIG. 2 is a schematic diagram of a user interface display presenting a time line view obtained from a time search engine.

FIG. 2 is a schematic diagram of a graphical user interface display at the user device such as any of the user devices 122, 124, 126 of FIG. 1 showing the display of time objects retrieved using the time search engine 116 of FIG. 1. A user is able to enter a query into a query entry field 202. In the example of FIG. 1 the query "history of the world" has been entered. A user is able to specify whether a search should be carried out using a standard search engine. In that case the user selects "ALL RESULTS" 204 and receives a ranked list of web pages from a standard search engine in response to the query. In order to specify that a time search engine should be used (such as that of FIG. 1) then the user is able to select the "timeline view" option 206. In the example of FIG. 1 a user has selected that option and submitted the query. A ranked list of time objects is returned in this example these are presented in chronological order (according to the date object of each time object) against a display of a time line 214. However, it is not essential to use a chronological order. Other types of time-related presentation methods may be used.

The time line display comprises a graphical bar or line labeled with graphical indications to indicate a chronological order of items positioned along the time line. The time line may represent a linear time scale, a logarithmic time scale, or a non-linear time scale. For example, some regions of the time line may represent time at a fine scale and some may represent time at a coarse scale. The time line may contain gaps to indicate time periods which are not represented using that time line. In the example of FIG. 2 each time object 208 is connected to the time line 214 to indicate the date of each time object. However, this is not essential.

Figure 3:
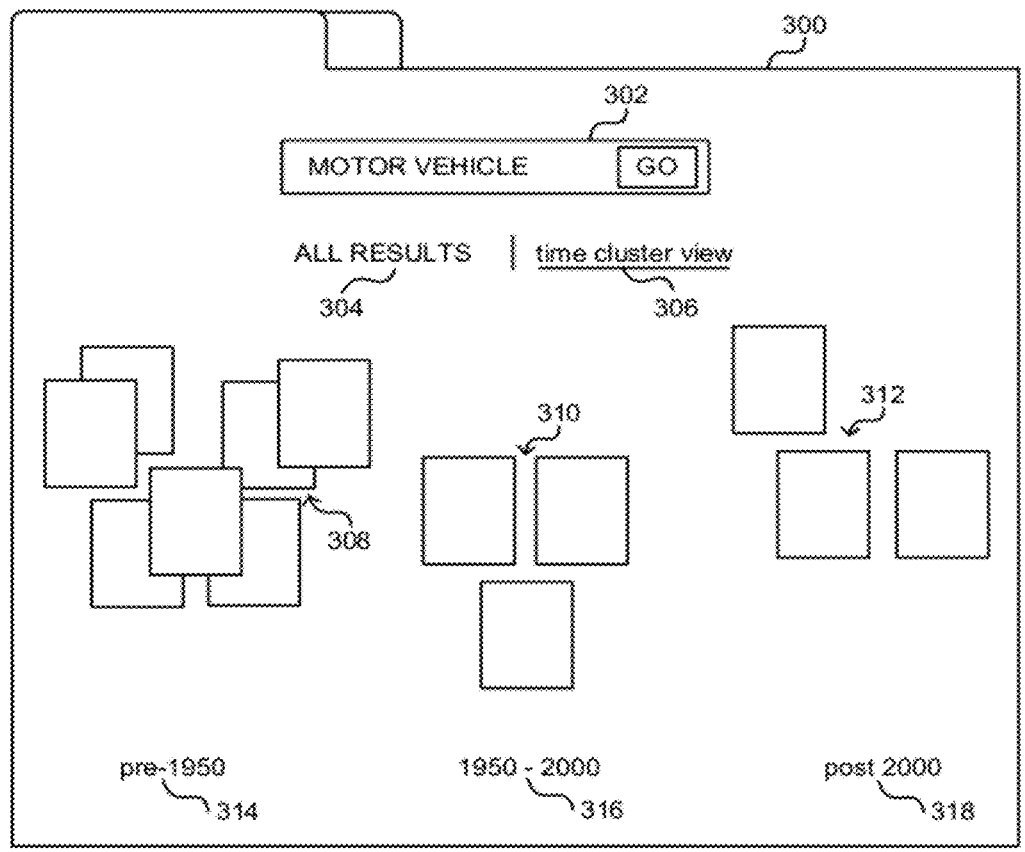
FIG. 3 is a schematic diagram of another user interface display presenting a time cluster view obtained from a time search engine.

FIG. 3 is a schematic diagram of another graphical user interface display showing the display of time objects retrieved using a time search engine. In this case, clusters of time objects 308, 310, 312 are displayed rather than a time line. A user is able to enter a query into a query field 302 and in this example the query is "motor vehicle". A user is able to select an option to search a standard search engine by selecting "ALL RESULTS" 304. In this example, the user has selected "time cluster view" 306 to search a time search engine and view the returned time objects in clusters. Time labels 314, 316, 318 are presented for each cluster. For example, cluster 308 displays time objects with dates that are pre 1950. Cluster 310 displays time objects with dates from 1950 to 2000 and cluster 312 displays time objects with dates that are post 2000.

Each time object 208 in this example comprises an image 210 and a piece of text 212. However, this is not essential. In other examples the time objects may be composites of other types of media content.

Figure 4:
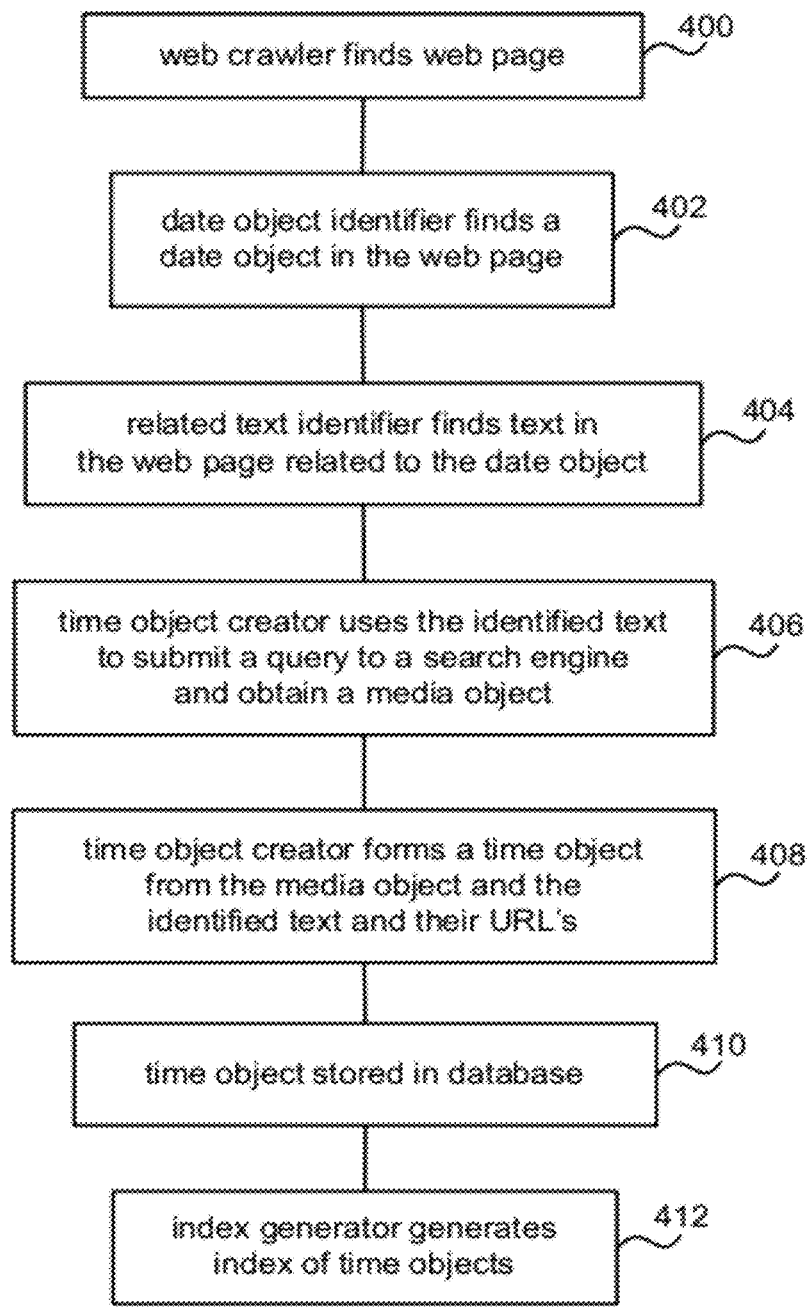
FIG. 4 is a flow diagram of a method at a web crawler and index generator.

More detail about the process of creating time objects is now given with reference to FIG. 4. A web page is found 400 by the web crawler and made available to the date object identifier (102 of FIG. 1). The date object identifier finds 402 a date object in the web page. As mentioned above, a date object is numerical and/or textual date information of any format. Once the date object identifier has found a date object in a web page it converts that date object into a specified format for saving in an associated time object.

The date object identifier is computer-implemented and may comprise rule-based software for identifying numerical and/or textual dates in web pages. In other examples the date object identifier comprises machine learning components which are trained to identify dates in web pages.

A related text identifier (104 of FIG. 1) finds 404 text in the web page which is related to the date object. To achieve this a language model and/or grammatical rules are used. In other example, heuristics may be used such as identifying any text within a specified proximity of the date object. Combinations of these approaches may be used. The related text identifier makes its output available to a time object creator.

A time object creator (106 of FIG. 1) uses the identified text to submit 406 a query to a search engine and obtain a media object. A media object is a piece of content of any media type. The search engine may be any type of search engine which is able to receive text as a query and to return content of media types which are not text (although that content may be part of web pages that comprise text). For example, in some embodiments the query is submitted to an image search engine which returns images in response to text queries. In other embodiments the text query is modified by adding search terms that ensure that the returned content will comprises non-text media items. In other embodiments the query is submitted to a search engine which returns content of a variety of types and the returned content is filtered to select content of a media type which is not text. Optionally the time object creator checks that the content returned by the search engine is downloadable.

The time object creator forms 408 a time object from the media object and the identified text. These items are packaged together with the URLs of the web pages from which the media object and the identified text were obtained. The date object for the identified text is also stored with the time object. The date object is stored in the time object in the specified format. The time object creator stores 410 the time object at the time object database (108 of FIG. 1) or at any other suitable location accessible to the web crawler, the index generator and the index.

The index generator generates 412 (or updates) an index of the time objects as the time objects are formed. This process may be carried out offline or may be incremental as time objects are formed.

Figure 5:
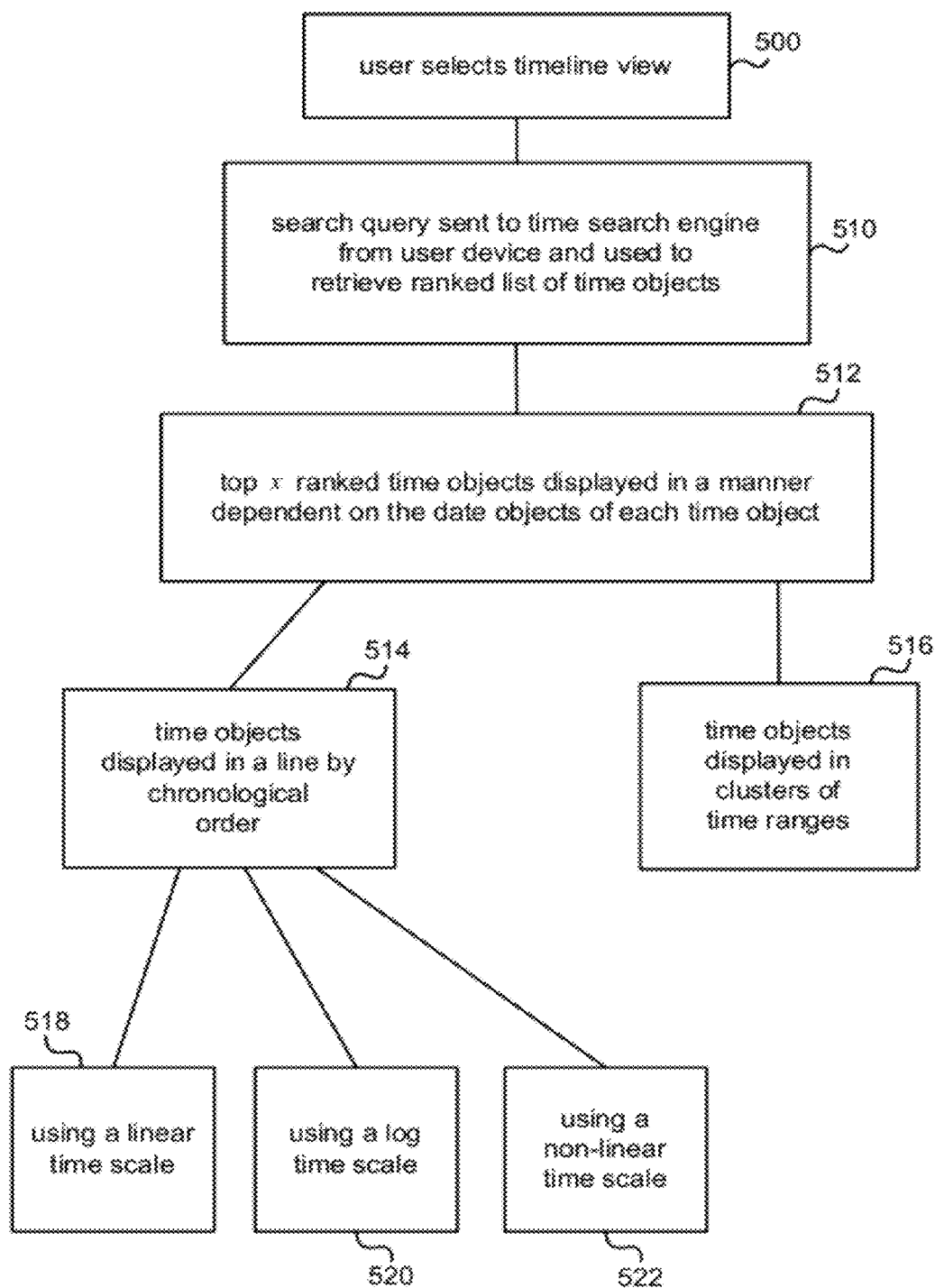
FIG. 5 is a flow diagram of a method of querying a time search engine.

More detail about the process of operating the time search engine is now given with reference to FIG. 5. A user at a user device such as those illustrated in FIG. 1 (122, 124, 126 of FIG. 1) accesses the time search engine and selects 500 a time line view or other option to indicate that the time search engine is to be used. The user enters a search query which is sent 510 to the time search engine from the user device and used to retrieve a ranked list of time objects. The search query is of any suitable form. For example, the query may comprise key words, phrases, example items or parts of items such as images, emails, SMS messages or other items. A ranked list of time objects is returned where the ranking is based on relevance of the time objects to the query according to the process used to form the index. Each of the time objects has a date object. There may be more than one time object in the ranked list with the same date object. Also, the ranked list of time objects may not be a chronological order of the date objects of those time objects.

The time search engine sends the top x ranked time objects for display 512 at the user device in a manner dependent on the date objects or range of each time object. Any suitable number of time objects may be displayed depending on the capabilities of the user device, the communications infrastructure and the application domain. In some examples the time objects are displayed 514 in a line by chronological order of the date objects. For example, as illustrated in FIG. 2 and using a linear time scale 518, or a logarithmic time scale 520 or another type of non linear time scale 522. The time objects may also be displayed in clusters 516 of time ranges as illustrated in FIG. 3. In this way a user is quickly and easily able to carry out a search with a concern for time without the need to manually date information.

Figure 6:
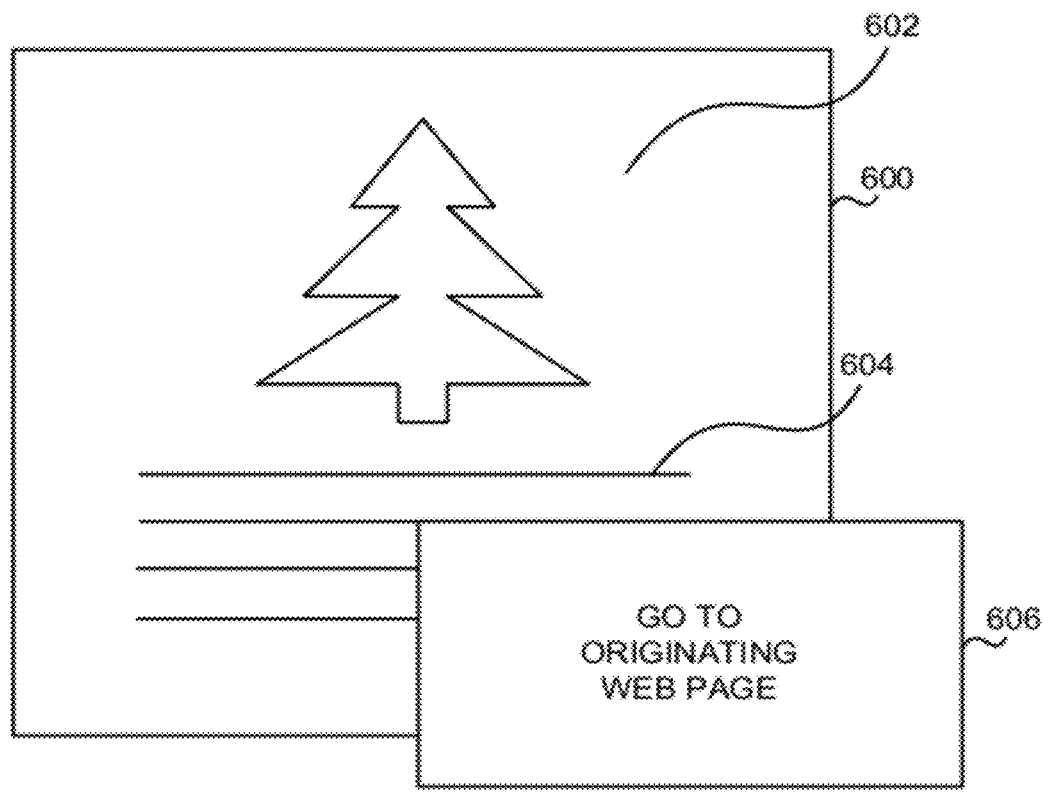
FIG. 6 is a schematic diagram of a time object and pop up display.

Once a time object is displayed to a user the user is able to continue his or her search using that time object. For example, as illustrated in FIG. 6 a time object 600 is displayed comprising an image 602 and a piece of text 604. If the user hovers a mouse or other user interface device over the time object text 604 a pop up button 606 appears. When the user selects that button the URL of the web page from which the text 604 originated is downloaded and displayed at the user device. The URL is found from the time object. Similarly, if the user hovers a mouse or other user interface device over the image 602 a pop up button appears to enable the user to display the web page from which that image originated. Other user input may be used to cause the pop up buttons to appear. Also, the time object may have different media types of content from those illustrated in FIG. 6.

In some embodiments the time objects are dynamically created as a web page is viewed and displayed together with that web page. This is now described with reference to FIG. 7.

Figure 7:
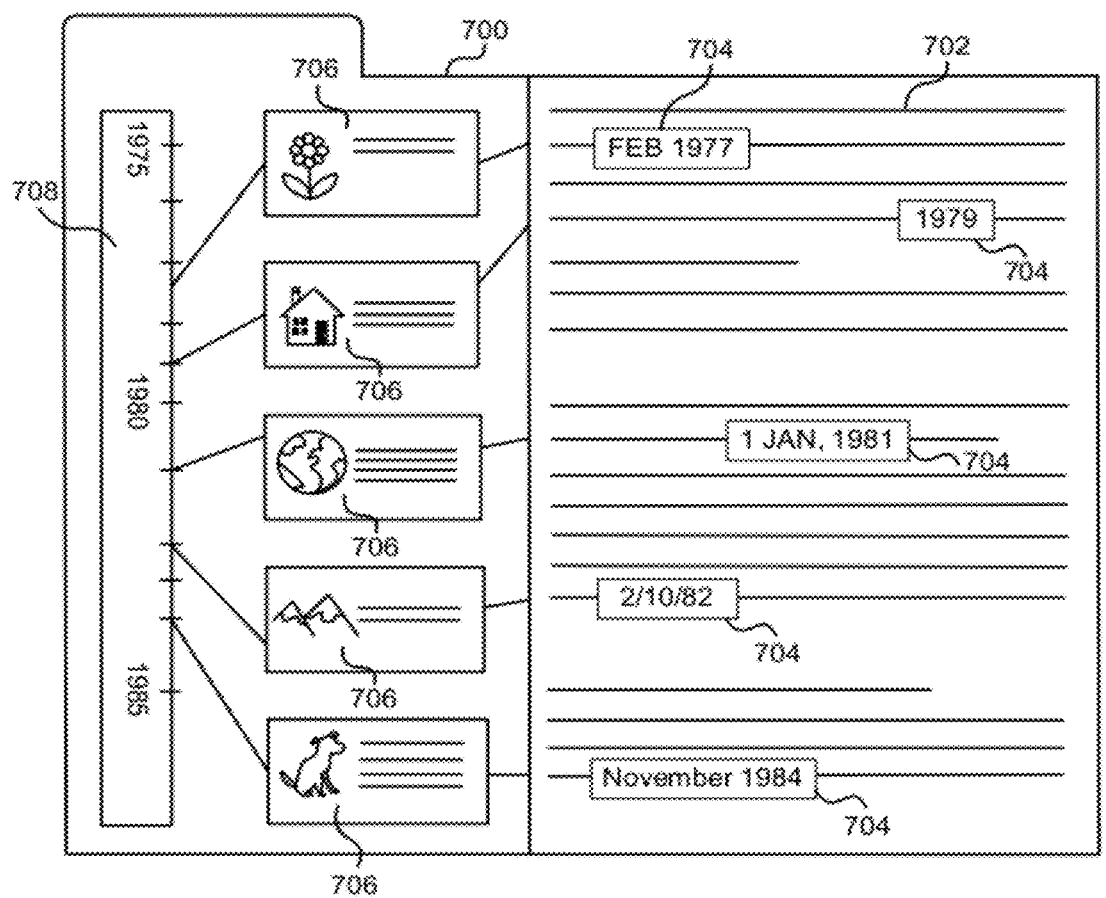
FIG. 7 is a schematic diagram of a user interface display presenting a web page and a plurality of time objects related to that web page.

FIG. 7 is a schematic diagram of a graphical user interface display 700 at a user device. The display shows a web page 702 being browsed by a user and in this example the web page comprises text indicated schematically by horizontal lines. The text of the web page 702 comprises a plurality of date objects 704 in this example. For each date object a time object 706 is formed and displayed with the web page. In the example of FIG. 7 the time objects are displayed adjacent to the web page as a chronological list against a time line 708. However, this is not essential. The time objects may be displayed in any manner with the web page 702 as long as the manner of display is related to the date objects of the time objects. For example, they may be embedded in the web page or may be displayed adjacent to the web page using date-range clusters rather than a time line. If a time line is used it may be linear, logarithmic, non linear and may contain gaps as discussed above with reference to FIGS. 2 and 3. The time objects may also be presented as a slide show.

Figure 8:
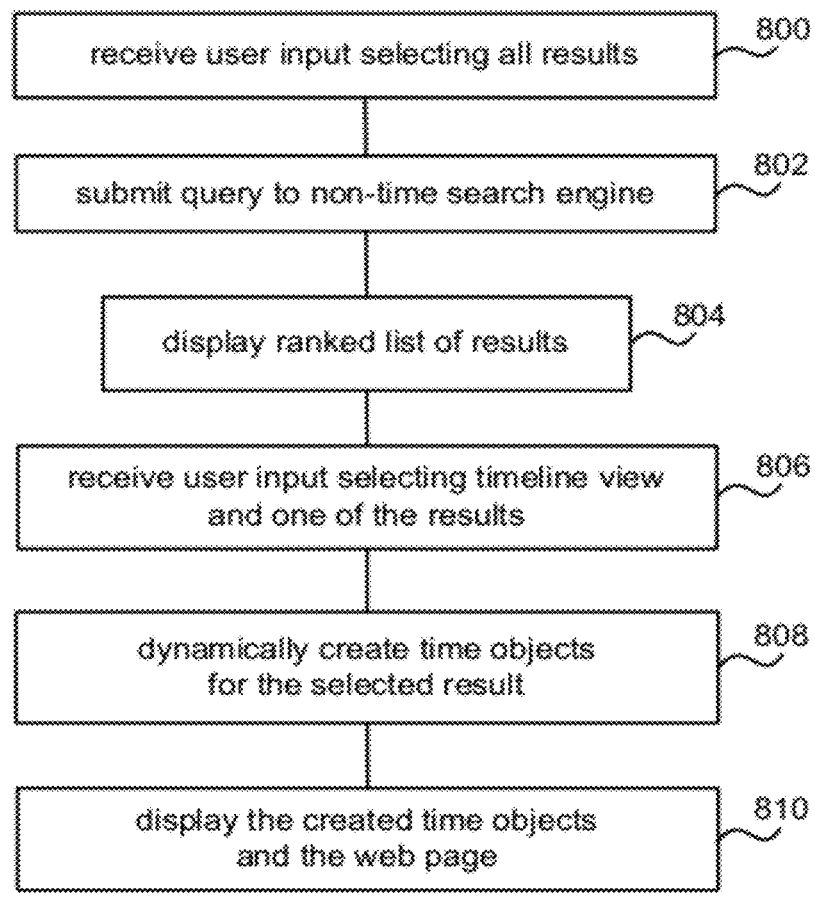
FIG. 8 is a flow diagram of a method of dynamically creating time objects for display with a web page.

A method of dynamically creating time objects and displaying those with a web page is now described with reference to FIG. 8. User input is received 800 at a user device such as any of the PDA 122, laptop 124 or PC 126 of FIG. 1 specifying a conventional search such as using search engine 114 of FIG. 1. For example, a user selects an option for "all results" at a graphical user interface. The user enters a query and this is sent from the user device to a non-time search engine such as search engine 114 of FIG. 1. A non-time search engine is one which does not search an index of time objects. The query is of any suitable form. For example, the query may comprise key words, phrases, example items or parts of items such as images, emails, SMS messages or other items. The user device receives and displays 804 a ranked list of results in response to the query. For example, this may be a ranked list of links to web pages. User input is received 806 at the user device selecting one of the results and a time related view. Software at the user device or located elsewhere in the communications network 118 then dynamically creates time objects for the selected result. The process of creating the time objects is the same as that described above with reference to FIG. 4 except that steps 400 and 412 of FIG. 4 do not occur. The date object identifier, related text identifier, time object creator and time object database are provided either integral with the user device or as services available to the user device over communications network 118. The dynamically created time objects are displayed 810 with the selected web page at the user device.

Figure 9:
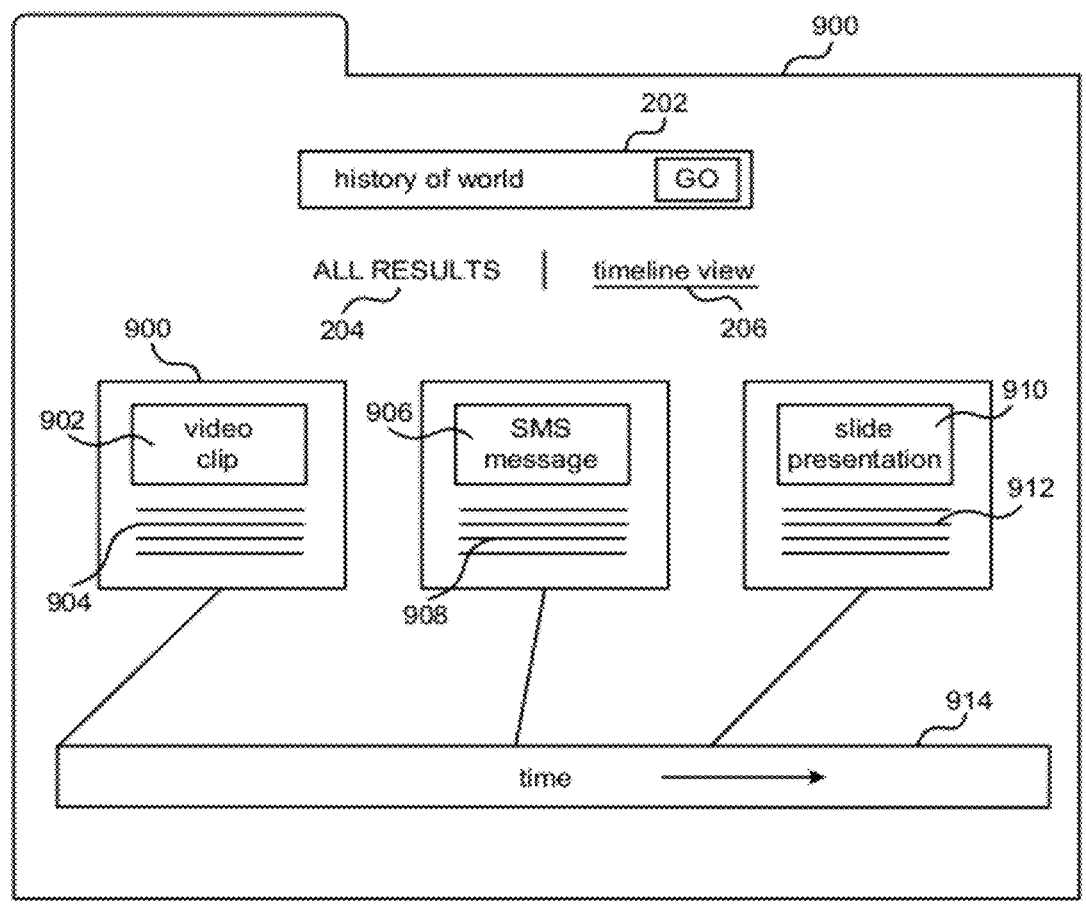
FIG. 9 is a schematic diagram of a user interface display presenting time objects.

As mentioned above time objects are composites of content of different media types obtained from different sources. For example, FIG. 9 shows a graphical user interface display similar to those of FIGS. 2 and 3. A time search engine has been used to search using the query "history of world" and three time objects have been returned and are displayed against a time line 914. One of the time objects 900 is a composite of a video clip 902 and a piece of text 904, another is a composite of an SMS message 906 and a piece of text 908 and another is a composite of a slide presentation 910 and a piece of text 912.

Figure 10:
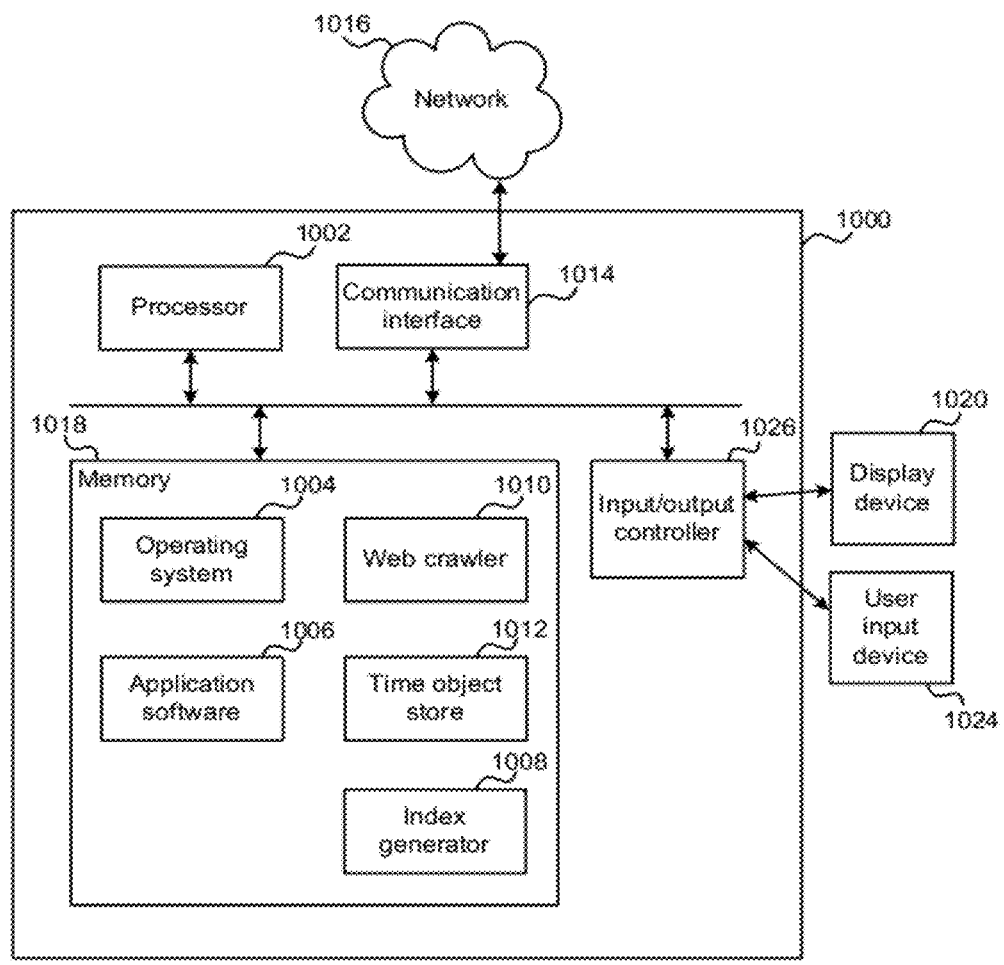
FIG. 10 illustrates an exemplary computing-based device in which embodiments of an information retrieval system which creates time objects may be implemented.

FIG. 10 illustrates various components of an exemplary computing-based device 1000 which may be implemented as any form of a computing and/or electronic device, and in which embodiments of a system for creating time objects may be implemented.

The device comprises communication interface 1014 which enables the device to connect to a communications network 1016 in order to communicate with other entities in the communications network. For example, it is able to receive media content, web pages, Internet Protocol (IP) input, and other types of input through the communications interface 1014.

Computing-based device 1000 also comprises one or more processors 1002 which may be microprocessors, controllers or any other suitable type of processors for processing computer executable instructions to control the operation of the device in order to generate time objects and/or provide an information retrieval system which uses time objects. Platform software comprising an operating system 1004 or any other suitable platform software may be provided at the computing-based device to enable application software 1006 to be executed on the device. For example, the computing-based device 1000 comprises a web-crawler 1010, an index generator 1008 and a time object store 1012.

The computer executable instructions may be provided using any computer-readable media that is accessible by computing based device 1000. Computer-readable media may include, for example, computer storage media such as memory 1018 and communications media. Computer storage media, such as memory 1018, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1018) is shown within the computing-based device 1000 it will be appreciated that the storage may be distributed or located remotely and accessed via a network or other communication link (e.g. using communication interface 1014).

The computing-based device 1000 also comprises an input/output controller 1026 arranged to output display information to a display device 1020 which may be separate from or integral to the computing-based device 1000. The display information may provide a graphical user interface. The input/output controller 1026 is also arranged to receive and process input from one or more devices, such as a user input device 1024 (e.g. a mouse or a keyboard). This user input may be used to access and use an information retrieval system. In an embodiment the display device 1020 may also act as the user input device 1024 if it is a touch sensitive display device. The input/output controller 1026 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of information retrieval comprising:
   at a date object identifier, accessing a first web page, identifying at least one date in the first web page and converting the at least one date into a specified format;
   at a related text identifier, identifying in the first web page a piece of text which is related to the at least one date;
   arranging a processor to generate a query using the piece of text and to send the query to a search engine;
   receiving a ranked list of web pages in response to the query and selecting one of the web pages;
   at a time object creator, downloading content from the selected web page and creating a time object by packaging together the piece of text, the downloaded content, and the at least one date in the specified format; and
   causing a display of the first web page at a graphical user interface and causing a display of the time object in conjunction with the first web page, the time object being dynamically generated for display with the first web page.

2. A method as claimed in claim 1, further comprising using a web-crawler to access the first web page and further web pages in order to create a plurality of time objects and storing the plurality of time objects at a database.

3. A method as claimed in claim 2, further comprising using an index generator to generate an index of the plurality of time objects stored at the database.

4. A method as claimed in claim 1 wherein the at least one date in the specified format is a date object, the method further comprising:
   accessing further web pages and creating a plurality of time objects including a plurality of corresponding date objects; and
   causing a display of at least some of the plurality of time objects at a graphical user interface in a manner dependent on the corresponding date objects of the at least some of the plurality of time objects.

5. A method as claimed in claim 4, further comprising causing a display of a time line at the graphical user interface and causing a display of the at least some of the plurality of time objects at positions relative to the time line that are related to the corresponding date objects of the at least some of the plurality of time objects.

6. A method as claimed in claim 5, further comprising causing a display of the time line such that the time line has a scale which is any of: non-linear, logarithmic, discontinuous.

7. A method as claimed in claim 4, further comprising causing a display of clusters of the plurality of time objects according to date ranges, the clusters comprising time objects of specified date ranges.

8. A method as claimed in claim 1 wherein the time object creator includes a universal resource locator (URL) of the first web page and a URL of the selected web page in the time object.

9. A method as claimed in claim 8, further comprising causing a display of the time object at a graphical user interface, receiving user input selecting at least one of the piece of text or the downloaded content of the time object and downloading and causing a display of a web page using a universal resource locator included with the time object.

10. An information retrieval system comprising;
   a processor;
   memory having instructions executable by the processor, the memory comprising:
      a date object identifier to access a first web page, identify at least one date in the first web page and convert the at least one date into a specified format;
      a related text identifier to identify in the first web page a piece of text which is related to the at least one date;
   the processor configured to generate a query using the piece of text and to send the query to a search engine;

the processor further configured to receive a ranked list of web pages in response to the query and to select one of the web pages;

the memory further comprising:
- a time object creator to download content from the selected web page and create a time object by packaging together the piece of text, the downloaded content, and the at least one date in the specified format; and
- a graphical user interface to present the time object in conjunction with the first web page and wherein the time object is dynamically generated for presentation with the first web page.

11. An information retrieval system as claimed in claim 10 the memory further comprising a web-crawler to access further web pages in order to create a plurality of time objects and to store the plurality of time objects at a database.

12. An information retrieval system as claimed in claim 10 wherein the time object creator is further configured to include a universal resource locator (URL) of the first web page and a URL of the selected web page in the time object.

13. An information retrieval system as claimed in claim 10 wherein the at least one date in the specified format is a date object, the information retrieval system further configured to create a plurality of time objects including a plurality of corresponding date objects; and to present at least some of the plurality of time objects at a graphical user interface in a manner dependent on the corresponding date objects of the at least some of the plurality of time objects.

14. An information retrieval system as claimed in claim 13, further configured to present a time line at the graphical user interface and to present the at least some of the plurality of time objects at positions relative to the time line that are related to the corresponding date objects of the at least some of the plurality of time objects.

15. A computer storage medium, the computer storage medium being hardware, storing instructions that when executed by one or more processors perform actions comprising:

accessing a first web page; identifying at least one date in the first web page;

converting the at least one date into a specified format;

identifying in the first web page a piece of text which is related to the at least one date;

causing generation of a query using the piece of text and sending the query to a search engine;

receiving a ranked list of web pages in response to the query and selecting one of the web pages;

downloading content from the selected web page and creating a time object by packaging together the piece of text, the downloaded content, and the at least one date in the specified format; and causing a display of the first web page at a graphical user interface and causing a display of the time object in conjunction with the first web page, the time object being dynamically generated for display with the first web.

16. A computer storage medium as claimed in claim 15, the actions further comprising causing a display of a time line at the graphical user interface and causing a display of a plurality of time objects at positions relative to the time line that are related to the dates of the plurality of time objects.

17. A computer storage medium as claimed in claim 16, the actions further comprising causing a display of the time line such that the time line has a scale which is any of: non-linear, logarithmic, discontinuous.

18. A computer storage medium as claimed in claim 15, the actions further comprising causing a display of clusters of the plurality of time objects according to date ranges such that each cluster of the plurality of time objects is associated with a different date range, the clusters comprising time objects of specified date ranges.

19. A computer storage medium as claimed in claim 15, the actions further comprising causing a display of the plurality of time objects in chronological order of the dates of the plurality of time objects.

\* \* \* \* \*